Dec. 3, 1957 V. K. MAYER 2,815,136
HYDRAULIC PISTON PARKING DOLLY
Filed Aug. 9, 1954 2 Sheets-Sheet 1

INVENTOR.
Victor K. Mayer
BY
Atty.

Dec. 3, 1957  V. K. MAYER  2,815,136
HYDRAULIC PISTON PARKING DOLLY
Filed Aug. 9, 1954  2 Sheets-Sheet 2

INVENTOR.
Victor K. Mayer
BY
Atty.

United States Patent Office 2,815,136
Patented Dec. 3, 1957

2,815,136

HYDRAULIC PISTON PARKING DOLLY

Victor K. Mayer, Portland, Oreg.

Application August 9, 1954, Serial No. 448,621

8 Claims. (Cl. 214—95)

This invention relates to a mechanical parking facility and, more particularly, to a wheeled dolly for use in combination with the elevator and gantry crane of such a facility to load, park, and depark automobiles. In this connection, the instant invention is related to the following copending common assignee applications; Stagger Stall Parking, Serial No. 442,952; Modular Parking, Serial No. 444,755 and now abandoned; Elevator for Mechanical Parking, Serial No. 442,954; and Self Propelled Mechanical Parking Dolly, Serial No. 442,953.

One object of the instant invention is to provide a wheeled mechanical parking dolly which is actuated, selectively, by either of twin hydraulically extensible piston-and-cylinder units, the piston-and-cylinder units being mounted upon an elevator and being capable of movement for a distance equal to at least two automobile lengths in order to accommodate tandem parking within a mechanical parking facility. In use, the piston-and-cylinder units serve to restrain the dolly to straight line movement and to provide an accurate, sure control during use.

In general orientation, this and the above identified copending applications all are concerned with alleviation of the shortage of off-street parking in metropolitan business districts by the provision of a mechanical parking facility which financially is sound and engineeringwise, is practical. The shortage of off-street parking is born (a) of the increasing municipal prohibition of on street parking in order to speed traffic flow and (b) of the increasing numbers of automobiles on the road. City planners, metropolitan land owners, merchants, motorists and those charged with property tax collection all are aware of these facts and each is concerned since it is self-evident that the centralized business district is dependent for its very economic existence upon the provision of adequate off-street parking. Quite naturally, if a motorist cannot park, or if parking fees are too high, the motorist cannot or will not leave his automobile in order to patronize a centralized business district. The merchant with decreased sales revenue resultant from the loss of patronage traceable to the parking problem cannot afford to pay fixed rent. Lower rents require that the land owner demand lower land assessment values. Lower assessed valuations decrease the property tax intake of the municipality and the county. In sum total, these results illustrate a problem, the problem of the provision of adequate off-street parking, which city planners now classify as their most critical and most pressing long range problem. In alleviation thereof, it is a cooperative objective of the instant invention and the copending inventions above listed to provide a mechanical parking facility which is practical and which will generate sufficent revenue to attract private capital and private enterprise to the mechanical parking field.

In a mechanical parking structure of the type to which this invention pertains, there is provided a multistory building usually of a skeletal and minimum cost construction, in which the upper stories are occupied by parking stalls and the lower story by an entrance and exit and by retail shops and stores. A gantry crane and elevator move within the building laterally and vertically, respectively, to service the various stories in the parking and return of automobiles. In the above described copending applications, there is disclosed an elevator of cantilever type which is adapted to carry two rather than one dolly, each dolly functioning to lift and carry an automobile into and out of a parking stall during a parking operation. The instant invention primarily is concerned with the hydraulically actuated dolly which, in function, moves longitudinally off of and onto either end of an elevator while picking up and delivering automobiles.

Sequentially, in a mechanical parking facility constructed in accordance with my invention, automobiles are delivered to the lower floor of the building by motorists through an entranceway. Thereafter, the motorist sets his hand brake, locks the doors and is issued a claim check. A dolly then leaves the elevator, moves between the wheels of the automobile and lifts the same clear of the floor. The automobile and dolly then return to the elevator and, where two automobiles are delivered, the companion dolly also carries an automobile aboard the elevator. The elevator is mounted upon a movable gantry crane structure. Accordingly, the elevator moves vertically as the gantry crane moves laterally to carry the two loaded dollies to a point adjacent two vacant tandem type parking stalls in an upper story of the mechanical parking facility. The dollies then move out into the stalls, park the automobiles and return to the elevator ready to begin an unloading or another parking sequence.

In provision of dual automobile movement mechanism for the service of tandem parking stalls, it is a further object of the instant invention to provide a pair of wheeled dollies which are carried by a single elevator, each dolly being actuated, selectively, by one of twin hydraulically extensible piston-and-cylinder units arranged parallel but oppositely facing and selectively engageable with the corresponding dolly to move the same substantially one or two automobile lengths beyond either end of the elevator.

A further object of my invention is to provide a propelling mechanism for a movable dolly in a mechanical parking facility, said propelling mechanism to include first and second hydraulic cylinders with nested pistons which carry novel coupler and coupling mechanism of non-stop type in order that one hydraulic piston is engaged at the same time that the other hydraulic piston is disengaged. In effect, such a coupler and coupling mechanism for a mechanical parking dolly assures, at all times, that the dolly is joined to one or the other of the twin actuating mechanisms to prevent an accidental runaway of the dolly.

Another object of my invention is to provide lateral guide means for the dolly in a mechanical parking facility such that the longitudinal movements of the dolly are limited yet accommodated and such that lateral movements of the dolly are inhibited. Such a lateral or guide mechanism allows the dolly to be skidded sidewise or laterally when an automobile is to be aligned or straightened up within a mechanical parking facility.

These and other advantages, objects, and capabilities inherent in and encompassed by my invention will become apparent from the ensuing description, taken in conjunction with the accompanying two sheets of drawings, wherein:

Fig. 4 is a detail view, taken substantially on the line 4—4 of Fig. 3, showing one of the hydraulic jack type raising mechanisms which serve to lift the automobile carrying platform of a dolly;

Fig. 5 is a detail view, taken substantially on the line 5—5 of Fig. 3, showing one of the plural wheels on which each dolly rides and the manner in which each of these wheels protrudes through an opening in the frame and platform of the dolly to allow use of as large a wheel diameter as possible;

Fig. 6 is a partial detail view, taken substantially on the lines 6—6 of Fig. 3, showing the solenoid actuated pins and the guide means which accommodate limited longitudinal movement but inhibit lateral movement of a dolly relative to the elevator;

Fig. 7 is a schematic diagram of the electrohydraulic mechanism and circuits which are carried by the dolly; and Fig. 8 is a schematic diagram of the electrohydraulic mechanism and circuits carried by the elevator.

Figure 1:
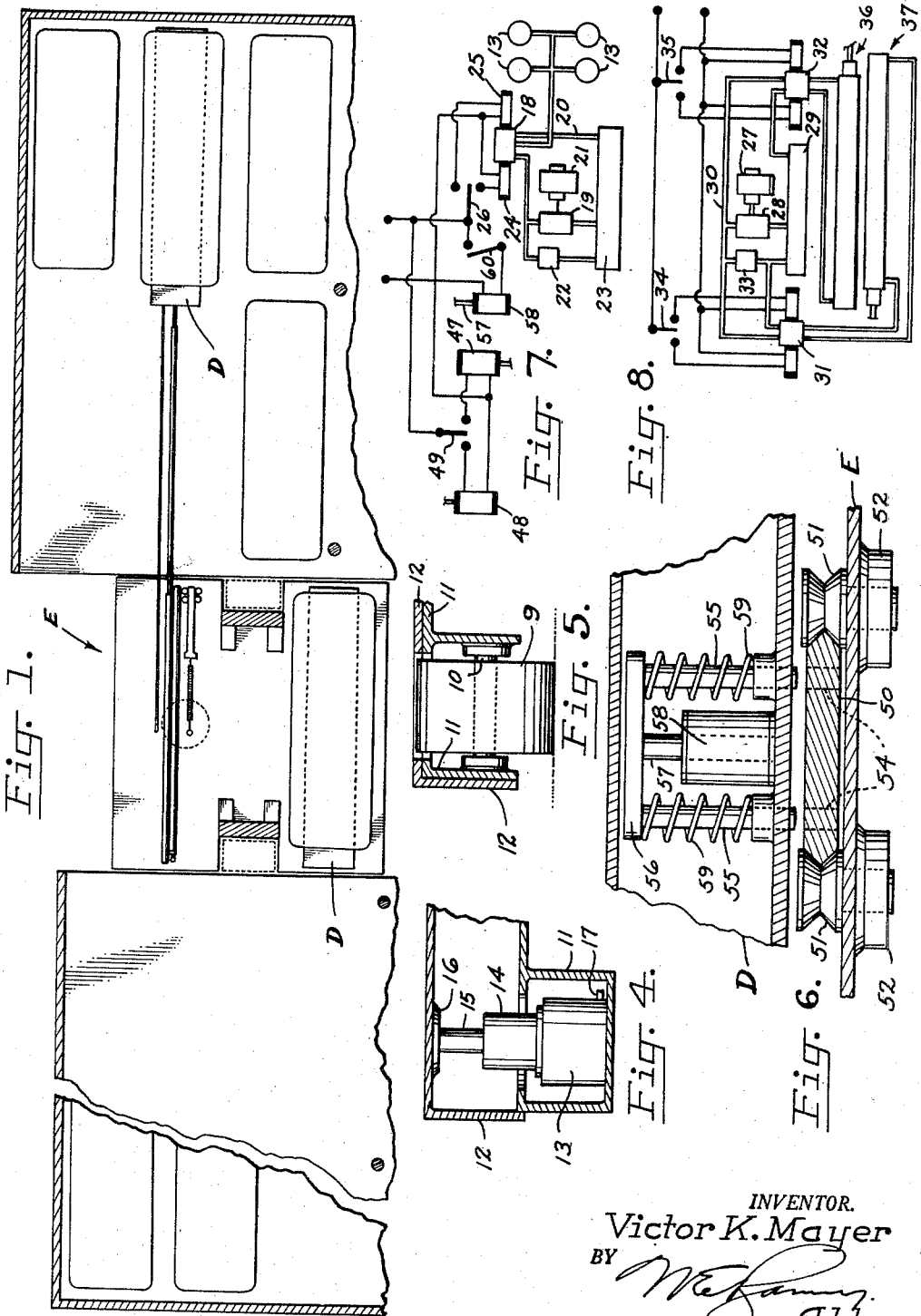
Fig. 1 is a partial plan view of a mechanical parking facility showing an elevator in position adjacent one of the upper stories of the facility and showing two of my novel wheeled dollies, each dolly having an automobile loaded there aboard and one dolly being shown fully extended while the other dolly is fully retracted to a position aboard the elevator.

In Fig. 1, there is illustrated a partial plan view looking down upon a portion of one of the upper stories of a multistory mechanical parking facility. In accordance with economical construction and accepted architectural design, it will be noted that this building is skeletal, functional, and simple to the end of providing a utilitarian structure. The details of the structure such as the arrangement of parking stalls and the like are unimportant to the instant invention but more fully are discussed and disclosed in the previously enumerated copending common assignee applications. Suffice to say, the building generally is constructed with two wings and an intermediate central well for a gantry crane and elevator. The wings each accommodate tandem parking as shown in Fig. 1 and a combination gantry crane and elevator E is mounted for both vertical and lateral movement within the elevator well. In function, the elevator E serves to carry two wheeled dollies, the details of which form the subject matter of the instant invention and now will be described.

Figure 2:
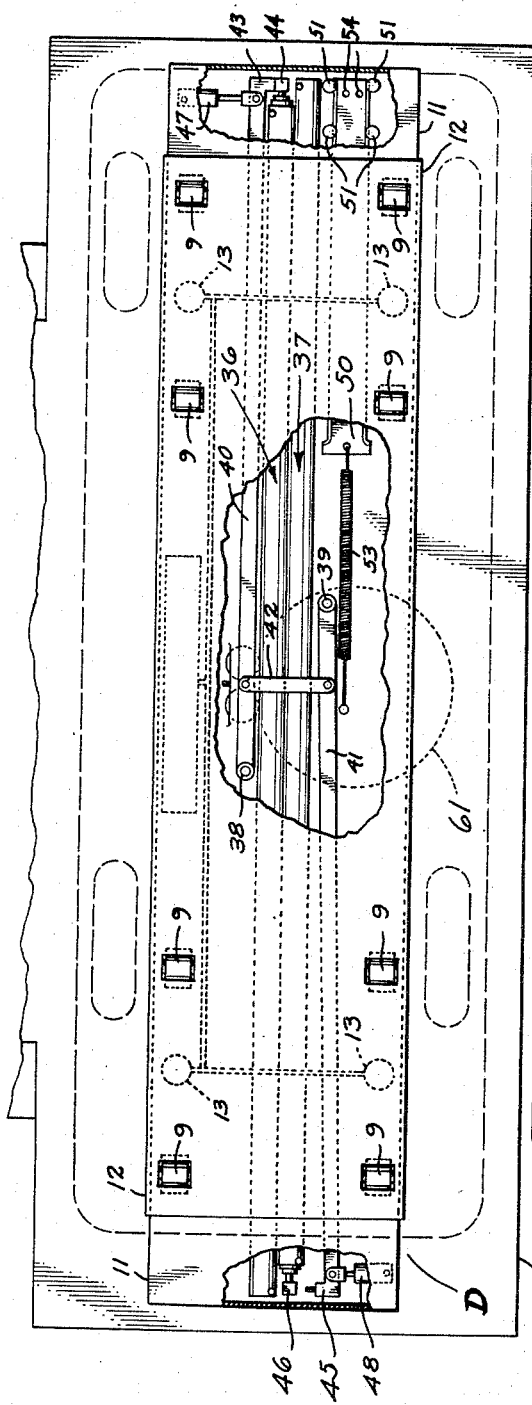
Fig. 2 is a partial plan view showing one-half of an elevator together with a wheeled dolly and an automobile carried thereby, portions of the automobile and structure being broken away to reveal details of the hydraulic piston and cylinder elements, the novel coupling and coupler units, and the linkage system for engaging and disengaging the couplers.
Figure 3:
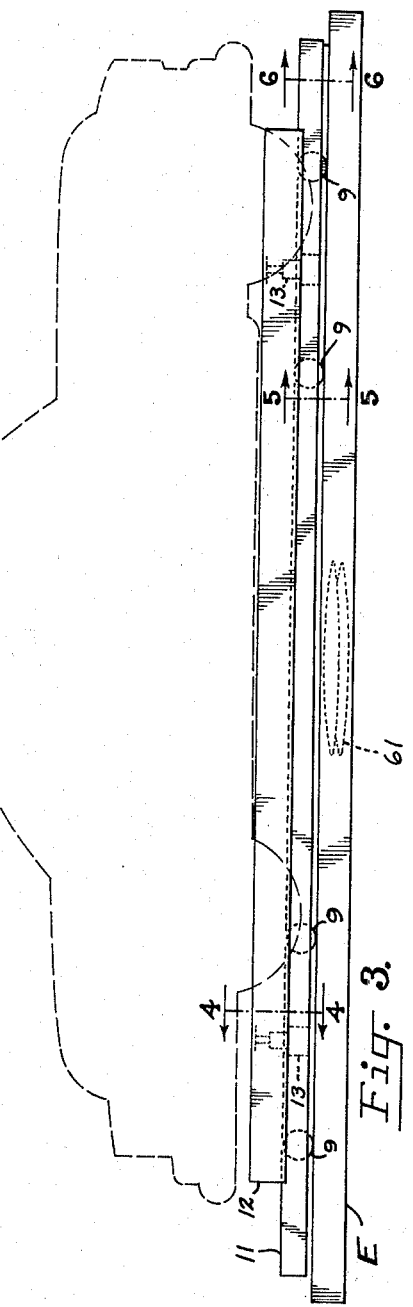
Fig. 3 is a side view of the mechanism shown in Fig. 2 better illustrating the relative positions of the various elements on the dolly with the platform raised.

Referring to Figs. 1 to 3, inclusive, it will be seen that each of the dollies D is constructed with dimensions such that it can ride under the axles and between the wheels and tires of a standard automobile. Thus, where the mechanical parking facility services primarily American made automobiles, an exemplary dolly may be 18.5 to 19 ft. in overall length by 6.5 in. high by 43 in. wide. In certain other countries, such as the European countries, a smaller dolly is necessary since the dimensions between the wheels and the overall length of the standard European automobile is less.

Each of the dollies D is made mobile by means of a plurality of smooth, unflanged roller wheels 9 which are journaled upon individual axles 10 secured to the main frame member 11 beneath the movable platform 12. Preferably, the wheels 9 carry a nylon, rubber, or other smooth tread in order to roll smoothly on flat surfaces such as are provided by the platform of the elevator E and by the concrete slab normally provided as the first floor of a mechanical parking facility. To further promote a smooth running dolly, each wheel 9 is made as large as possible within the space limitations imposed by the critical dimensions of the dolly. By cutting away the frame 11 and platform member 12 where these elements overlie one of the wheels 9, I am enabled to provide a wheel diameter equal to the height of the dolly (about 6½ inches) as shown in Fig. 5.

Turning now to the mechanism by which each of the dollies D raises an automobile clear of the floor, I have shown in Fig. 4 the details of a hydraulic jack type raising mechanism designated generally by the numeral 13. Identical units of this mechanism underlie each of the approximate corners of the vertically movable platform member 12 as shown in Fig. 2. In detail, each of these raising units comprises a hollow cylindrical base member 13 which defines a hydraulic cylinder and nested piston elements 14 and 15 joined, as at 16, to the underside of the vertically movable platform member 12. The base 13 of each jack is equipped with a hydraulic conduit 17 joined via a four way motor valve 18 to a fluid pump 19 and a return line 20. As shown in Fig. 7, the pump 19 is driven by an electric motor 21 and a by-pass valve 22 and hydraulic fluid reservoir 23 complete the hydraulic circuit. Returning to the valve 18, this element is ported to receive pressure fluid from the pump 19, to return the fluid to the reservoir 23 via the return conduit 20, and selectively, to supply or exhaust fluid from the four identical jack raising mechanisms 13.

Actuation of the above described valve and the jack raising mechanism is provided by two solenoids 24 and 25 and the associated electric circuit illustrated in Fig. 7. This entire mechanism is carried by the dolly D and it functions such that in the unactuated position of the parts shown in Fig. 7 the pump 19 merely circulates hydraulic fluid from the reservoir 23 via the conduits through the by-pass valve 22 back to the reservoir. Utilizing the electric switch 26, actuation of the solenoid 24 moves the valve 18 to a position whereby pressure fluid is fed from the pump 19 to each of the hydraulic jacks 13 in order to raise the movable platform member 12 to the position of Fig. 4. Similarly, movement of the switch 26 to an opposite position actuates the solenoid 25 to move the valve 18 in an opposite direction and bleed fluid from each of the jacks 13, via the return conduit 20, to the reservoir 23 and lower the movable platform member 12 from the position of Fig. 4.

To propel each of the dollies D, I prefer to utilize the hydraulic piston-and-cylinder mechanism shown in Figs. 2 and 8, it being understood that the mechanism shown in Fig. 8 is mounted aboard the aforementioned elevator E. Briefly, an electric motor 27 drives a hydraulic pump 28 to furnish pressure fluid from a reservoir 29 to a pressure conduit 30. The pressure conduit 30, in turn, is joined to ports in the twin four-way valves 31 and 32 from whence return conduits and a by-pass valve 33 complete this portion of the hydraulic circuit. As will be apparent, each of the four-way valves 31 and 32 is solenoid actuated to either of two extreme positions and is spring centered to a neutral center or hold position. Thus, the electric switch 34 controls actuation of the four-way valve 31 and the electric switch 35 controls actuation of the four-way valve 32 although some manufacturers may prefer to utilize more complex automatic control circuits.

Comparing those portions of Fig. 2 which are broken away and the lower portion of Fig. 8, it will be seen that the above described electrohydraulic circuit is intended to control two twin hydraulically extensible piston-and-cylinder units 36 and 37. In function, the piston-and-cylinder unit 36 moves the dolly D to the right in the drawings whereas the similar unit 37 moves the dolly to the left in the drawings. As previously was explained with reference to Fig. 1, it is preferred with my inventive structure that each dolly be capable of parking two automobiles in tandem. This requirement dictates the use of plural nested pistons such as are indicated diagrammatically in Fig. 8. To this end, each unit consists of a single cylinder within which slidably are arranged two nested pistons such that an initial supply of pressure fluid to the closed end of the cylinder acts upon the outermost piston to move both pistons the full length of cylinder. A continued supply of pressure fluid to the same point thereupon moves the innermost piston within the outermost piston a distance substantially equivalent to the length of the cylinder. Thus, in total, a movement of two cylinder lengths is accommodated by the two nested pistons of each unit 36 and 37. For example, movement of the switch 34 in Fig. 8 to the left will actuate the left solenoid controlling the four-way valve 31 to supply pressure fluid from the pump 28, via the pressure or feed conduit 30, through the valve 31, to the right end of the piston-and-cylinder unit 37. Simultaneously, fluid is drained from the left end of the piston-and-cylinder unit 37 to return via the valve 31 and the return conduit to the reservoir 29. As a result of this supply of pressure fluid to the right end of the unit 37 and the simultaneous exhaust of pressure fluid from the left end of the same unit, the larger of the nested pistons within the unit first moves the full length of the cylinder and, thereafter, the smaller or innermost piston moves a similar distance. Extension of the pistons in the unit 37, of course, can be stopped at a precise point by moving the electric switch 34 to the central position shown in Fig. 8. This deactivation of the switch 34 de-energizes the solenoid switch controlling the valve 31 and allows the centering springs therein to return the said valve to a neutral center position blocking flow through the ports thereof and holding the piston-and-cylinder unit immobile.

Turning to Fig. 2, the hydraulically extensible piston-and-cylinder units 36 and 37 are shown mounted upon the elevator E and arranged side by side and parallel beneath the dolly D. In addition, this figure illustrates the lengths of each piston-and-cylinder unit relative to the elevator E, the dolly D, and a standard automobile shown superimposed in dashed outline. As explained in the previously mentioned copending applications, a survey of automobile dimensions is taken in a given locality where one of the mechanical parking facilities of Fig. 1 is to be constructed. From this survey, a standard or modular length and width is derived such that substantially all of the automobiles in use in that locality will fit within a parking space and stall of modular length and width. As concerns a modular length, the preferred dimensions of the instant invention utilize 19 feet when American made automobiles are to be moved and parked. Thus, the tandem parking stalls of Fig. 1 each are 19 ft. plus 19 ft. or 38 ft. in total length. Similarly, the elevator E is 19 ft. in length plus or minus a few inches for a safety factor. The dolly D, on the other hand, is slightly shorter than the elevator, an exemplary length of 18½ to 19 ft. being sufficient. The hydraulic piston-and-cylinder units 36 and 37 are arranged within the length of the dolly so as to provide an overall maximum travel of each dolly D substantially equal to twice the length of the modular automobile and/or elevator and dolly. Since a vast majority of American made automobiles are less than 18½ ft. in overall length, no crowding will be evident in the normal operation of the mechanical parking facility when the above listed dimensions are utilized. On the other hand, when the occasional extremely long automobile is encountered, it is evident that the full length of the dolly and elevator will be utilized. This extreme length automobile preferably is parked in an inboard one of the tandem type stalls shown in Fig. 1.

In Fig. 2, I have shown an oppositely acting linkage means which is movable non-stop (that is, from one extreme to another extreme position without stop) when the dolly is centered upon the elevator. This linkage functions to engage and, simultaneously, to disengage one or the other of the piston and cylinder units 36 and 37 with the dolly. To this end, a pair of pivot shafts 38 and 39 are fixed to the underside of each dolly main frame member 11. The pivot shaft 38 functions with and carries an elongated link 40, the pivot shaft 39 carries a similar link 41 and the two links 40 and 41 are joined intermediate their ends by a cross link 42. A coupler 43 is mounted adjacent the terminal end of the link 40 and is provided with a protruding pin adapted to mate with the cavity in a latch 44 secured to the terminal end of the piston rod of the innermost piston of the unit 36. For the piston and cylinder unit 37, a similar coupler 45 and latch 46 are provided. The underside of the dolly D also carries a pair of solenoids 47 and 48 the armatures of which pivotally are joined to the links 40 and 41 respectively.

In Fig. 7, a switch 49 controls actuation of the solenoids 47 and 48. Thus, actuation of the said switch to the right in Fig. 7 will energize the solenoid 47 to pull the link 40 and associated mechanism nonstop from the position shown in Fig. 2 to a position whereby the coupler 43 is disconnected from the latch 44 simultaneously as the coupler 45 is connected with the latch 46. This movement is effected by the coaction of the cross link 42 and the pivots 38 and 39, together with a proportioning of the pins and mated latches 44 and 46 such that the dolly preferably never is disconnected from one or the other of the hydraulic piston-and-cylinder units 36 and 37. That is to say, with the dolly centered upon the elevator E, actuation of one or the other of the solenoids 47, 48 moves the linkage system 38, 39, 40, 41, 42 simultaneously to disconnect one piston-and-cylinder unit at the same time as the other piston and cylinder unit is connected. A more complete description of the function of this mechanism will be described hereinafter when the operation of the dolly is set forth.

During a normal operation of the dolly D, joinder of one of the hydraulic piston-and-cylinder units 36, 37 to the dolly via the above described linkage will cause the dolly to move in a straight line as the pistons are extended within the cylinder. Because certain operations of the dolly may place an added or greater than normal lateral or sidewise strain thereupon during movement, I also have provided a lateral guide means which can be actuated to interconnect the elevator and dolly so as to inhibit lateral movement of the dolly relative to the elevator. This mechanism is shown in Figs. 2 and 6 to consist of an elongated guide bar 50 having tapered edges illustrated in detail in Fig. 6. The guide bar 50 is mounted for movement longitudinally of the elevator and dolly upon tapered roller wheels 51 which are journaled, as at 52, to the elevator E. Pairs of the rollers 51 are provided along a limited length of the elevator E so as to restrict the movement of the guide bar 50 to a straight line parallel the longitudinal dimension of the elevator and dolly. The return spring 53 normally holds the guide bar 50 in the position shown in Fig. 2. Opposed thereto, twin holes 54 pierce the guide bar 50 for reception of mated pins 55. A yoke 56 secured to the armature 57 of a solenoid 58 moves the two pins 55 as a unit into the twin holes 54 and twin return springs 59 disengage the pins 55 from the holes when the solenoid 58 is de-energized. In Fig. 7, the solenoid 58 and the armature 57 are shown, diagrammatically, under the control of a switch 60. Closure of the switch 60 energizes the solenoid 58 whereupon the armature 57 pulls the yoke 56 and the pins 55 downwardly to effect an engagement of the pins with the holes 54. Thereafter, so long as the switch 60 is held in a closed position, the guide bar 50 and the dolly travel as a unit back and forth. An exemplary use of this mechanism as a lateral guide means to inhibit lateral movement of the dolly while accommodating limited longitudinal movement thereof will be described in conjunction with the dolly operation hereinafter.

At 61 in Figs. 2 and 3, I have shown, in phantom outline, a rotatable drum for effecting a uniform paying out and reeling in of an electric control cable wherein are carried those electric lines or leads shown in Figs. 7 and 8 which must interconnect the mechanism on the dolly with the mechanism on the elevator. The details of this rotatable drum which is mounted upon the elevator and the details of the cable carried thereby are disclosed and described in detail in the aforementioned copending application entitled Self Propelled Mechanical Parking Dolly, Serial No. 442,953 and these details need not be repeated in the instant application. Suffice to say, the electric control cable allows the various solenoids and motors carried by the dolly to be controlled at a distance since the electric leads can be carried where desired. Such a distant control, for example, may be effected from the platform of the elevator E or from a central location within the mechanical parking facility of Fig. 1 as the manufacturer of the elevator may desire.

The operation of the dolly will be explained with particular reference to the schematic electrohydraulic diagrams of Figs. 7 and 8. In these figures, the various electrical, mechanical and hydraulic elements bear the same reference numerals as the corresponding parts in the remainder of the drawings. To illustrate a typical use of the elongated guide bar 50 and associated lateral guide mechanism, it will be assumed that a motorist has delivered his automobile to the lower story of the mechanical parking facility through an entranceway. A dolly D now will straighten up or align the automobile prior to movement of that automobile aboard the elevator E, it being apparent that precise alignment was not effected by the motorist himself. To effect such an alignment, the electric switch 49 is actuated to connect the appropriate one of the hydraulic piston and cylinder units 36 or 37 to the dolly via the coupling mechanism and linkage system previously described. For example, to achieve the positioning of the parts shown in Fig. 2, the switch 49 has been moved to the left in Fig. 7 to energize the solenoid 48. This energization has moved the link 41, the cross link 42, and the link 40 to the position shown in Fig. 2 causing the pin on the coupler 43 to mate with the latch 44 on the end of the piston rod of the unit 36. At the same time, the pin on the coupler 45 has been disconnected from the latch 46 so as to condition the dolly for movement to the right in Fig. 2. Thereafter, the electric switch 49 can be returned to a neutral position and the linkage and coupler systems will remain in the positions of Fig. 2 until a further actuation of the switch 49 is effected at a later time.

To align an automobile which has been left at a slight angle to the longitudinal dimension of the elevator and dolly within the entrance way of the mechanical parking facility, the switch 35 in Fig. 8 is moved to complete a circuit to the appropriate one of the solenoids controlling the four-way valve 32. Movement of the valve 32 allows the motor driven pump 28 to supply pressure fluid via the valve ports to the left end of the piston-and-cylinder unit 36 while exhausting fluid from the right end thereof. This supply and exhaust of pressure fluid extends the pistons within the unit 36 and causes the dolly D to move to the right. Immediately prior to actuation of the switch 35, the electric switch 60 in Fig. 7 is closed to actuate the solenoid 58 causing the pins 55 to enter the holes 54 and carry the elongated guide bar 50 with the moving dolly against the force of the returned spring 53. The leading end of the dolly then is moved out between the wheels and under the front axle only of the parked automobile. Thereafter, the switch 26 is actuated to energize the solenoid 24 controlling an upward movement of the jacks 13 via the four-way valve 18 and the pump 19. This sequence of operation raises the vertically movable platform 12 and lifts the front end of the automobile clear of the floor within the entrance way of the mechanical parking facility. Thereafter, appropriate control mechanism for the gantry crane which carries the elevator E is energized to move the gantry crane and elevator laterally within the building a short distance sufficient to align the automobile. This lateral movement, of course, skids the dolly D and the front end of the automobile laterally or sidewise within the entrance way until the automobile is aligned precisely with the longitudinal dimension of the elevator and dolly. During this lateral skidding of the dolly, the guide bar 50 resists the sheer and the bending forces imposed upon the dolly by this operation. I am enabled to provide a short guide bar 50 because alignment operations will be effected only when an automobile is close to the elevator.

Once the automobile is aligned, the switch 26 is closed to energize the solenoid 25 controlling the valve 18 to lower the jacks 13. At the same time, the switch 60 is opened and the return spring 53 returns the elongated guide bar 50 to the position shown in Fig. 2. Thereinafter, the switch 35 is closed to extend the hydraulic piston-and-cylinder unit 36 causing the dolly D to move completely under both axles and between the wheels of the aligned automobile. The dolly platform again is raised to lift the automobile clear of the floor, the four-way valve 32 is moved by energization of the solenoid controlling the same through the electric switch 35, and the dolly and automobile return to the elevator as a unit. Thereinafter, the elevator and gantry crane are actuated to lift the two dollies and the one or two automobiles carried thereby to positions adjacent vacant parking stalls in an upper story of the mechanical parking facility.

To park an automobile in the left wing of the mechanical parking facility as shown in Fig. 1, the electric switch 49 must be manipulated to energize the solenoid 47 and move the linkage and couplers from the position of Fig. 2 to a position wherein the coupler 45 mates with the latch 46. This coupling operation connects the hydraulic piston-and-cylinder unit 37 to the dolly and, simultaneously, disconnects the unit 36. Thereinafter, manipulation of the electric switch 34 will cause the dolly to move to the left and, when the dolly is within a vacant parking stall, the solenoid 25 actuates the control valve 18 to lower the automobile to a parked position. The dolly then is returned to the elevator and further parking operations can proceed in similar manner.

In conclusion, it will be seen that I have provided a novel wheeled dolly which is actuated selectively, by either of twin hydraulically extensible piston and cylinder units. Each of these units is connectable with the dolly selectively to move the same back and forth across the floor of an elevator and substantially two lengths beyond either end thereof. In combination with the other disclosed associated mechanisms, this dolly finds utility within a mechanical parking facility adapted to alleviate the shortage of off street parking in metropolitan areas.

I claim:

1. In combination with an elevator having a length at least as great as the overall length of an automobile, a pair of elongated wheeled dollies arranged side by side parallel the longitudinal dimension of and carried by said elevator, each of said dollies having a vertically movable platform actuated by a plurality of identical hydraulic jacks the common actuation of which is controllable at a distance from the dolly, hydraulically extensible piston-and-cylinder means for each of said dollies mounted upon said elevator and engageable with the corresponding dolly selectively to move the dolly back and forth across the elevator and substantially two elevator lengths beyond either end thereof, each said means including two parallel but oppositely facing and separately operable piston and cylinder units, and coupling means selectively to couple one or the other of each of the two piston-and-cylinder units with the dolly corresponding thereto.

2. In a mechanical parking facility for automobiles, a wheeled dolly having a vertically movable automobile lifting and carrying platform means for lifting an entire automobile above the dolly proper, parallel but oppositely facing twin hydraulic piston-and-cylinder means, said hydraulic piston-and-cylinder means each including a single cylinder with plural nested piston means extensible in the same direction to protrude a total distance greater than the length of an automobile, coupling means adjacent the end of each said nested piston means selectively for coupling said dolly with one or the other of said twin hydraulic means, and other means interconnecting said coupling means so that only one coupling means may be in coupling relationship at one time.

3. In combination with an elevator having a length exceeding that of a standard automobile, a flat thin dolly movable under the axles of an automobile and having unflanged wheels of substantially the same diameter as the height of the dolly, a vertically movable automobile lifting and carrying platform means arranged upon said dolly for lifting an automobile clear of said elevator, parallel but oppositely facing twin hydraulic piston-and-cylinder means mounted upon said elevator, said twin hydraulic piston-and-cylinder means each including a single cylinder with plural nested piston means extensible in the same direction to protrude a total distance equal to substantially twice the length of the elevator, and coupling means adjacent the protruding end of each said nested piston means movable non-stop when the dolly is centered upon said elevator between a position coupling said dolly with a first one only of said twin hydraulic means to a position coupling the dolly with the other one only of the twin means.

4. In a mechanical parking facility for automobiles, a wheeled dolly having a vertically movable automobile carrying platform, parallel but oppositely facing twin hydraulic piston-and-cylinder means, said hydraulic piston-and-cylinder means each including a single cylinder with a plural nested piston means extensible in the same direction from the cylinder to protrude a total distance substantially equivalent to the length of two automobiles, coupling means selectively for coupling said dolly with one or the other of said twin hydraulic means, and lateral guide means selectively engageable by and movable with said dolly to accommodate limited longitudinal movement but to inhibit lateral movement of the dolly, said guide means being operable in but one direction of dolly movement and for less than the full distance of such movement.

5. In combination with an elevator having a length exceeding that of a standard automobile, a wheeled dolly having a vertically movable automobile carrying platform, parallel but oppositely facing twin hydraulic piston-and-cylinder means each including a single cylinder with plural nested piston means extensible in the same direction to protrude a total distance equal to substantially twice the length of the elevator, coupling means adjacent the protruding end of each said nested piston means movable non-stop when the dolly is centered upon said elevator between a position engaging said dolly with a first one only of said twin hydraulic means to a position engaging the dolly with the other one only of the twin means, said coupling means being carried by the dolly and being actuated by solenoid means controllable at a distance from the dolly, and lateral guide means carried by said elevator and selectively engageable by and movable with said dolly to accommodate limited longitudinal movement but to inhibit lateral movement of the dolly relative to the elevator.

6. In combination, a vertically and laterally movable elevator means having a length at least as great as that of a standard automobile, a dolly having a vertically movable automobile carrying platform, parallel but oppositely facing twin hydraulic piston-and-cylinder means mounted upon said elevator, said hydraulic piston-and-cylinder means each including a single cylinder with plural nested piston means extensible in the same direction to protrude a total distance equal to substantially twice the length of the elevator, coupling means adjacent the protruding end of each said nested piston means selectively for engaging said dolly with one or the other of said twin hydraulic means, said coupling means including an oppositely acting linkage means movable non-stop when the dolly is centered upon said elevator between a position engaging said dolly with a first one only of said twin hydraulic means to a position engaging the dolly with the other one only of the twin means, and lateral guide means for interconnecting said elevator and said dolly to accommodate limited longitudinal movement but to inhibit lateral movement of the dolly relative to the elevator, said guide means being operable in but one direction of dolly movement and for less than the full distance of such movement, said guide means including a spring biased guide bar movable between rollers carried by said elevator and connectable with the dolly by solenoid actuated pin means.

7. A propelling mechanism for a movable dolly in a mechanical parking facility, comprising first and second parallel elongated hydraulic cylinders arranged side by side but with oppositely facing open ends, a pair of nested pistons slidably arranged within each said cylinder and carrying a single piston rod extensible through the open end of the cylinder, a coupling unit adjacent the terminal end of each said piston rod, the overall length and arrangement of each nested piston-and-cylinder mechanism being sufficient to accommodate an extension movement of the corresponding coupling unit a distance equal to at least two automobile lengths, and an elongated unitary linkage system extending the full length of said two side by side cylinders and carrying, adjacent each end thereof, a coupler mechanism mateable with the corresponding coupling unit.

8. A propelling mechanism for a movable dolly in a mechanical parking facility, comprising first and second parallel elongated hydraulic cylinders arranged side by side but facing in opposite directions, each said cylinder having an open end and a closed end, a pair of nested pistons slidably arranged within each said cylinder and carrying a single piston rod extensible through the open end of the cylinder, a coupling unit adjacent the terminal end of each said piston rod, the overall length and arrangement of each nested piston-and-cylinder mechanism being sufficient to accommodate an extension movement of the corresponding coupling unit a distance equal to at least two automobile lengths, an elongated unitary linkage system extending the full length of said cylinders and carrying adjacent each end thereof a coupler mechanism mateable with the corresponding coupling unit, actuation means joined to said linkage system selectively to engage and mate one said coupler with the corresponding coupling unit while simultaneously disengaging the other coupler from the other coupling unit, and hydraulic pump, valve and conduit means joined to each of said hydraulic cylinders selectively to extend and retract said nested pistons.

References Cited in the file of this patent

UNITED STATES PATENTS

| | | |
|---|---|---|
| 1,869,046 | Buck | July 26, 1932 |
| 2,073,721 | Wheelock | Mar. 16, 1937 |
| 2,113,986 | Kent | Apr. 12, 1938 |
| 2,626,065 | Sanders | Jan. 20, 1953 |
| 2,675,134 | Becker | Apr. 13, 1954 |